United States Patent [11] 3,602,835

[72] Inventor Otto Deutschbein
8 rue Gueudin, Montrouge, France
[21] Appl. No. 9,479
[22] Filed Feb. 9, 1970
[45] Patented Aug. 31, 1971
[32] Priority July 13, 1966
[33] France
[31] 69,421
Continuation-in-part of application Ser. No. 652,050, July 10, 1967.

[54] CONTINUOUS WAVE, FLUORESCENT SOLID LASERS
1 Claim, 2 Drawing Figs.

[52] U.S. Cl. ................................................. 331/94.5
[51] Int. Cl. .................................................. H01s 3/09
[50] Field of Search ..................................... 331/94.5; 313/184

[56] References Cited
UNITED STATES PATENTS
| | | | |
|---|---|---|---|
| 2,965,790 | 12/1960 | Ittig et al. | 313/217 |
| 3,258,716 | 6/1966 | Nassau et al. | 331/94.5 |
| 3,337,762 | 8/1967 | Vincent | 313/7 |
| 3,353,115 | 11/1967 | Maiman | 331/94.5 |

Primary Examiner—Ronald L. Wibert
Assistant Examiner—T. Major
Attorney—Abraham A. Saffitz ABSTRACT: A long lasting continuous-wave, solid laser of relatively low pumping power, on the order of 1 kilowatt, comprising a rod of laser active material having at least one absorption band in the near infrared range from 0.75 to 0.97 microns and an elongated arc quartz lamp filled up with krypton under a pressure between 1.5 and 6 atmospheres and having a length $l$ and a diameter $d$ whose product $ld$ is larger than $W/300\pi$, $W$ being the input power of the lamp. The rod and the lamp are disposed along the focal lines of an elliptical cylinder reflector.

PATENTED AUG 31 1971

3,602,835

INVENTOR
OTTO DEUTSCHBEIN

BY Abraham A. Saffitz

ATTORNEY

CONTINUOUS WAVE, FLUORESCENT SOLID LASERS

This is a continuation-in-part of copending U.S. Pat. application Ser. No. 652,050, filed July 10, 1967.

The present invention relates to an improvement to the continuous wave, fluorescent solid laser comprising essentially, in known manner, a rod of laser material, which will produce stimulated emission of radiation, an excitation lamp which pumps power into the laser material and an optical system for focusing the optical exciting flux emitted by said lamp, on to the rod.

Different types of excitation lamps and associated reflectors have been proposed in the prior art for pumping lasers to obtain high energy level output in very short times. Particularly helical lamps and coaxial lamps with cold electrodes encompassing the laser rod with circular cylindrical reflectors surrounding the lamp have already been disclosed for flash operation. The energy consumption of these lamps per each flash is of the order of 280 joules in the helical lamp for flashes of 0.1 ms. and of the order of 150 joules in the coaxial lamps for flashes of 4.5 microseconds in the case of a ruby laser containing paramagnetic chromium ions. This large feed energy is due in part to the circular cylindrical reflector which does not focus the whole optical flux of the lamp onto the laser rod and also in the particular case of the helical lamp to the fact that the optical energy is radiated at discrete points separated by the helix pitch along the laser rod length. Due to their large energy consumption and their high current density these types of excitation lamps are not convenient for laser continuous wave operation and existing continuous wave lasers do not actually use them.

It has also been proposed to excite an elongated laser active member by an elongated lamp, the member and the lamp being located along the focal lines of an elliptical cylinder. In this structure all the rays radiated by the lamp are focused onto the laser member whatever reflections the rays may encounter. Due to the optical energy transfer without dissipation loss from the excitation lamp to the active medium, the pulse energy consumption of the lamp in flash operation is lesser than in the case of coaxial and helical excitation lamps, say 16 joules instead of 150 joules for the coaxial lamps which is 10 times lesser. It results therefrom that elongated excitation lamps in elliptical reflectors are well adapted to produce continuous coherent light beams by laser action.

In the present state of the art, a type of laser which best satisfies the optimum conditions to be achieved is described in the article "The operational characteristics of a cw Nd; Ca $WO_4$ laser in the range of dry ice to room temperature" by H. R. Aldag, R. S. Horwath, C. B. Zarowin, in "Applied Optics," Optical Society of America, New York, vol. 4, No. 5, May 1965, pages 559 to 563.

The laser described in this article comprises:
  a laser rod of calcium tungstate (Ca $WO_4$) doped with neodymium, with a length of 35 mm. and a diameter of 3 mm.;
  an elongated mercury exciting lamp of the GEA-H6 or A 1679 PEK type;
  an optical system for focusing the optical exciting flux consisting of a right elliptical cylinder, the laser rod and the pumping tube being disposed respectively along the focal lines of said cylinder.

The rod and the tube are cooled by a suitable liquid coolant, for example water.

An examination of FIG. 6 of the article cited shows that at ambient temperature (20° C.);
  the "laser threshhold" of the unit in question is reached for a power of 1250 watts supplied to the mercury tube;
  beyond there, a power of 1450 watts supplied to the mercury tube is translated into emitted laser power of 0.050 watt.

This laser therefore has a total energy yield of
$0.050/1,450 = 3.45 \times 10^{15}$ Other luminous sources known which are suitable for use for the stimulation of a continuous wave laser are:

the tungsten filament incandescent tube in an iodine atmosphere (DWY tube), notably through the article entitled "Laser oscillations in Nd-doped yttrium aluminum, yttrium gallium and gadolinium garnets," by J. E. Geusic, H. M. Marcos, L. G. Van Uitert, in "Applied physics letters," American Institute of Physics, New York, vol. 4, No. 10, 15th May 1964, pages 182 to 184;

the xenon arc lamp, notably through the article entitled "A room temperature continuous Ca $WO_4$-Nd$^{+++}$ laser" by A. A. Kaminskit, L. S. Kornienko, G. V. Maksimova, V. Vosiko, A. M. Prokhonov, G. P. Shipulo, in "Soviet Physics J.E.T.P." American Institute of Physics, New York, vol. 22, No. 1, Jan. 1966, pages 22 to 25. The percent of this power, i.e. a power of $2.6 \times 1.4 \approx 3.6$ kilowatts, gives rise to an increase of output power of several tens of milliwatts. This results in an energy efficiency of about $10^{15}$.

It is well known that the optical incident energy flux in watts/cm.$^2$ at the laser crystal surface must exceed a predetermined threshold value and that, since the optical pumping energy is not entirely converted into laser emission energy, the residual fraction of this optical energy which appears in the form of heat poses technological problems regarding its removal which are difficult to solve, which leads to limitation as regards the pumping power per volume unit of the excitation lamp and consequently, as regards the power emitted per unit of volume of the laser material.

The actual pumping yield depends essentially on three factors, namely:
  the power yield of the excitation lamp, that is to say the ratio between the total radiant output of the lamp and the input electrical power consumed to feed it;
  the efficiency of the optical focusing system adapted to focus the maximum of the total optical flux radiated by the excitation lamp to the laser material;
  the "spectral adaptation," since the frequencies of the emission lines of the excitation lamp should correspond as well as possible to the frequencies of the absorption bands of the laser material used.

The general object of the invention is to provide a laser capable of continuous wave operation in the infrared range and requiring a relatively low pumping power, of the order of 1 kilowatt or slightly more.

Another object of the invention is to improve the ratio of the emission power of a continuous wave laser to the supply power of the excitation lamp of the laser and to lower the current density in the lamp.

A more particular object of the invention is to provide an excitation lamp which has a sufficient spectral efficiency at wavelengths corresponding to the absorption spectrum of the laser material although having outside said absorption spectrum conversion efficiencies lower than excitation lamps of the prior art.

Another object of the invention is to increase the lifetime of laser excitation lamps.

The laser of the invention comprises a laser material in the form of a rod having at least one absorption band in the near infrared range from 0.75 to 0.97 $\mu$, an elongated long arc krypton filled lamp, and a reflector in the form of an elliptical cylinder, the laser rod and the lamp being located along the focal lines of the reflector. Preferably the rod and the lamp have the same diameter and the interelectrode distance is equal to the rod length.

Krypton filled lamps are not in production at the present time because they have a low radiant efficiency in the visible spectrum region. Nevertheless, it is relatively easy to obtain it on specifications similar to those for the high-pressure xenon long-arc lamps, for example of the OSRAM XBF-1000 W-type, simply by replacing this latter gas with krypton and accepting the slight modifications in the electrical characteristics involved in this replacement.

Xenon lamps for illumination are characterized by a powerful luminous emission with a relatively low output of heat, the color temperature of the emitted light being very close to that of daylight and independent of variations in the supply voltage.

These characteristics remain if the xenon is replaced by krypton except for the fundamental difference that the krypton filled lamp has a powerful emission in the near infrared region, that is to say in the region of radiations having wavelengths comprised between 0.75 and 0.97 $\mu$ (see FIG. 1). Surprisingly, krypton has also quite a poor spectral power outside said range. For example, the conversion efficiency is 5.6 percent in the 0.75–0.97 $\mu$ range and always lower than 1.9 percent in the ranges 0.35–0.75 $\mu$ and 0.97–1.05 $\mu$. Krypton lamps are therefore extremely valuable in the continuous wave laser art if the laser material has strong absorption bands in this same region.

The invention will be better understood from the following description which refers to the accompanying drawings wherein.

Figure 1:
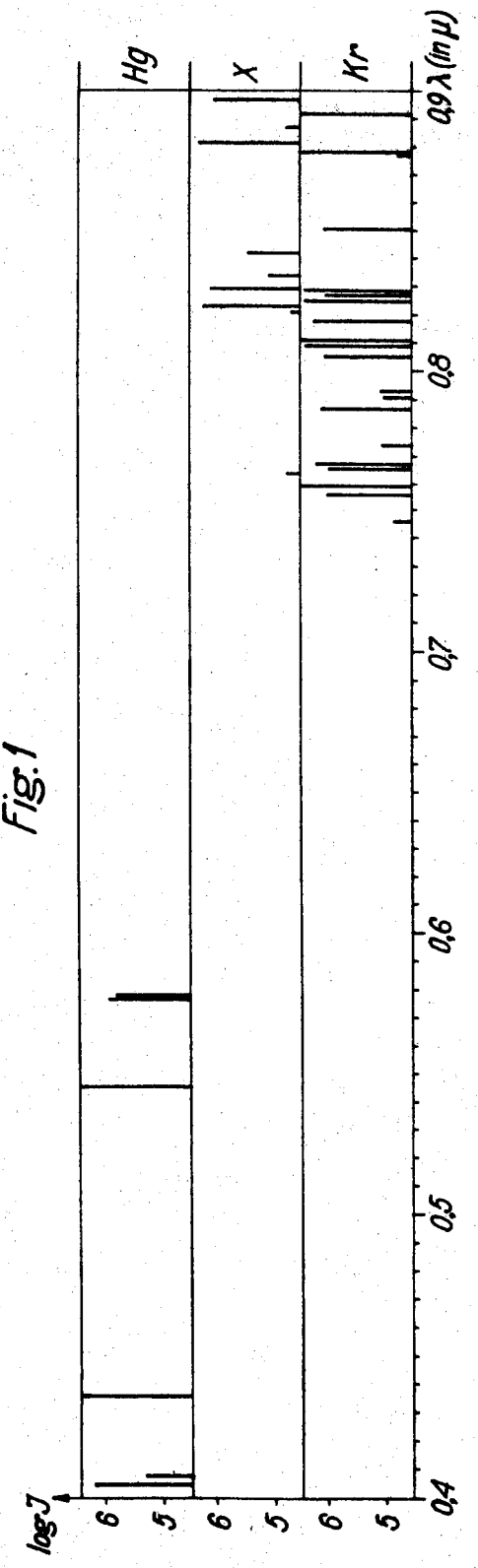
FIG. 1 is a comparative diagram of the intensities (in logarithmic scale) of the most intense emission lines of various excitation lamps, of the mercury, xenon and krypton types respectively (diagram already used in the above explanation)
Figure 2:
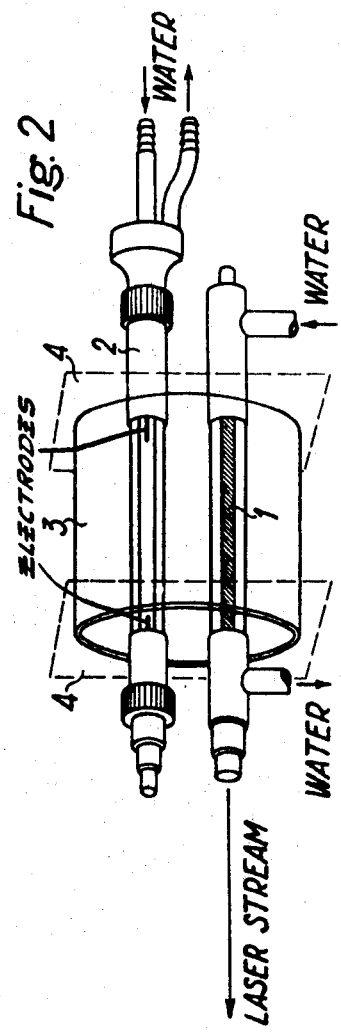
FIG. 2 is a diagrammatic side view of a laser unit according to the invention.

Referring now to FIG. 2, a laser unit was tested which comprises a laser rod 1 of calcium tungstate doped with neodymium, with a length of 50 mm. and a diameter of 3 mm. and a high-pressure long-arc krypton filled excitation lamp 2, that is to say with a filling pressure comprised between 1.5 and 6 atmospheres. The envelope of the lamp is in quartz and has an internal diameter of 3 mm., with a wall thickness of 1 mm. and an arc length of 50 mm. The lamp is fed by the alternating voltage of 220 v. of the mains through a conventional self-induction coil and it is water-cooled.

The rod 1 and the lamp 2 are cooled with water which circulates as indicated by the arrows in FIG. 2.

The optical focusing system consists essentially of a right elliptical cylinder 3, the rod and the lamp being disposed respectively along the focal lines of this cylinder, and of end plates 4 or plane frontal mirrors.

This unit afforded the following results at ambient temperature (+20° C.):

The R.M.S. voltage between the electrodes is 90 volts; the current in the lamp is 11 a. and the temperature of the electrodes in operation is about 1000° C.

The laser threshold is reached with a power of 300 watts supplied to the krypton lamp. Beyond that, a power of 1000 watts supplied to the krypton lamp is translated into a laser power of 0.9 watt which corresponds to an overall energy efficiency of
$0.9/1000=9\times10^{14}$ to be compared to $3.45\times10^{15}$ in the case of the laser of H. R. Aldag et al. and to $10^{15}$ in the case of the laser of Kaminskit et al. Further, the threshold power is lower than that of Aldag et al.'s laser and lower than the laser of Kaminskit et al.

The power density per volume unit of the lamp is $$\frac{1 \text{ kw.}}{(\pi/4)\times(0.3)^2\times 5}=3 \text{ kw. per cm.}^3$$

The current density per area unit of the section of the discharge tube of the lamp is:

$$\frac{11}{(\pi/4)\times(0.3)^2}=155 \text{ A per cm.}^2$$

The normal input power range is from 1 to 3 kw.

On the other hand the thermal load per surface unit of the wall of the discharge lamp is $$\frac{1000}{\pi\times 0.3\times 5}=220 \text{ w. per cm.}^2$$

With such a thermal load, there is no risk of the quartz being destroyed by melting or devitrification.

With a supply power of 1 kw., the krypton lamp has a lifetime exceeding 1,000 hours; after 1,000 hours the radiant power is lowered by 20 percent.

The voltage of the krypton lamp is limited by the risk of electrode sputtering which occurs if the energy of the impacting charge carriers is too high. In the krypton lamps of the invention, the upper limit of this voltage is 150 volts.

Increasing of the krypton pressure leads to an increase of the laser power output for a given lamp power input and also to an increase of the dynamic resistance of the lamp. Higher voltages are necessary to obtain the same power input. Limitation of the lamp voltage to 150 volts involves a correlative limitation of the krypton pressure to 6 atmospheres.

The thermal load of the lamp wall remain lower than the load causing damaging of the lamp, e.g. the load at the lamp wall must be less than 300 w./cm.² for quartz of conventional thickness ($\approx 1$ mm.). This means that the power density per cm.² which is equal to W divided by $\pi$ $dl$, where W is the power input wattage of the lamp, $d$ is its diameter and $l$ is its length, is equal to or lower than 300 watts per cm.². In the case above described, $d=3$ mm. and $l=50$ mm. and the above condition $$\frac{W}{\pi dl} \leq 300 \text{ watts per cm.}^2$$

involves $$W \leq 1.4 \text{ kilowatt.}$$

The laser material used to form rod 1 can be calcium tungstate doped with trivalent neodymium, yttrium aluminum garnet doped with neodymium or a calcium or strontium fluoride crystal doped with bivalent dysprosium.

I claim:

1. A long-lasting, continuous-wave, solid laser of relatively low pumping power, on the order of 1 kilowatt, comprising:
   a. a rod of laser material selected from the group consisting of calcium tungstate doped with neodymium, yttrium aluminum garnet doped with neodymium, calcium fluoride doped with dysprosium, and strontium fluoride doped with dysprosium, said las rod having at least one absorption band in the near infrared range from 0.75 to 0.97 microns;
   b. lamp and reflector means for focusing onto said laser rod exciting radiations for optically pumping said laser rod;
   c. the lamp of said lamp and reflector means consisting of an elongated generally cylindrical excitation discharge lamp formed of a quartz envelope filled with krypton which is under pressure of about 1.5 to 6 atmospheres, said lamp being supplied with an input voltage up to about 150 volts and a power input wattage, W, between about 1 and 3 kilowatts, the diameter $d$ and length $l$ of said lamp providing a product $dl$ equal to or more than said total input wattage, W, divided by $300\pi$;
   d. the reflector of said lamp and reflector means consisting essentially of a right elliptical cylinder and an end plane mirror; and,
   e. said laser rod and lamp being disposed respectively along the focal lines of said right elliptical cylinder between said cylinder and said end plane mirror, the diameter of the laser rod being the same as the diameter of the lamp and the interelectrode distance being equal to the length of the laser rod.